United States Patent
Wu et al.

(10) Patent No.: US 8,891,556 B2
(45) Date of Patent: Nov. 18, 2014

(54) SIGNAL FOR TRANSMISSION IN SINGLE-CARRIER COMMUNICATION SYSTEM

(75) Inventors: Ye Wu, Beijing (CN); Ming Lei, Beijing (CN)

(73) Assignee: NEC (China) Co., Ltd., Beijing (CN)

( * ) Notice: Subject to any disclaimer, the term of this patent is extended or adjusted under 35 U.S.C. 154(b) by 238 days.

(21) Appl. No.: 13/697,147

(22) PCT Filed: Aug. 4, 2010

(86) PCT No.: PCT/CN2010/001181
§ 371 (c)(1),
(2), (4) Date: Nov. 9, 2012

(87) PCT Pub. No.: WO2012/016353
PCT Pub. Date: Feb. 9, 2012

(65) Prior Publication Data
US 2013/0058361 A1 Mar. 7, 2013

(51) Int. Cl.
*H04W 4/00* (2009.01)

(52) U.S. Cl.
USPC .......................................... 370/482; 370/328

(58) Field of Classification Search
CPC ................. H04W 80/04; H04W 88/06; H04B 2203/5483; H04B 3/542
USPC .................................................. 370/328, 482
See application file for complete search history.

(56) References Cited

U.S. PATENT DOCUMENTS

| 2008/0219235 | A1 | 9/2008 | Ma et al. |
| 2009/0022135 | A1 | 1/2009 | Papasakellariou et al. |
| 2010/0254331 | A1* | 10/2010 | Kim et al. ..................... 370/329 |

FOREIGN PATENT DOCUMENTS

| CN | 1402546 A | 3/2003 |
| CN | 101755399 A | 6/2010 |
| GB | 2 446 446 A | 8/2008 |
| WO | 2008/056900 A1 | 5/2008 |

* cited by examiner

*Primary Examiner* — Ronald Abelson
(74) *Attorney, Agent, or Firm* — Sughrue Mion, PLLC (57) ABSTRACT

An apparatus and method for generating a signal for transmission in a single-carrier communication system are disclosed. The apparatus comprises a reference signal inserter, which multiplexes data symbols with reference signal symbols in time domain to form a plurality of symbol blocks as the signal for transmission, wherein the plurality of symbol blocks include symbol blocks of a first type and symbol blocks of a second type, wherein each of the symbol blocks of the first type includes only data symbols, and wherein each of the symbol blocks of the second type includes both data symbols and reference signal symbols.

16 Claims, 11 Drawing Sheets

SIGNAL FOR TRANSMISSION IN SINGLE-CARRIER COMMUNICATION SYSTEM

FIELD OF THE INVENTION

The invention generally relates to wireless communication, and, in particular, to an apparatus and method for generating a signal for transmission in a single-carrier communication system.

BACKGROUND

Compared to Orthogonal Frequency Division Multiplexing (OFDM) and Orthogonal Frequency Division Multiple Access (OFDMA) respectively, Single-Carrier Frequency Domain Equalization (SC-FDE) and Single-Carrier Frequency Division Multiple Access (SC-FDMA) show similar implementation complexity and robustness against highly dispersive channels, while generating a much lower peak-to-average power ratio (PAPR) waveform. SC-FDMA signals can be generated either in time domain or in frequency domain. However, in terms of implementation, the frequency-domain method is preferred, which utilizes the same system parameters and modules as those of the popular OFDMA to the maximum extent. As a multi-user extension version of SC-FDE and a variant of OFDMA, SC-FDMA has been adopted as the uplink communications scheme by the Third Generation Partnership Project (3GPP) Long Term Evolution (LTE).

In practical implementation of SC-FDMA and SC-FDE systems, channel estimation is required for channel equalization and further detection. This is usually achieved by inserting separated RS-bearing SC-FDMA/SC-FDE symbols for each user and then interpolating/extrapolating the frequency-domain channel responses for data-bearing SC-FDMA/SC-FDE symbols.

Figure 1:
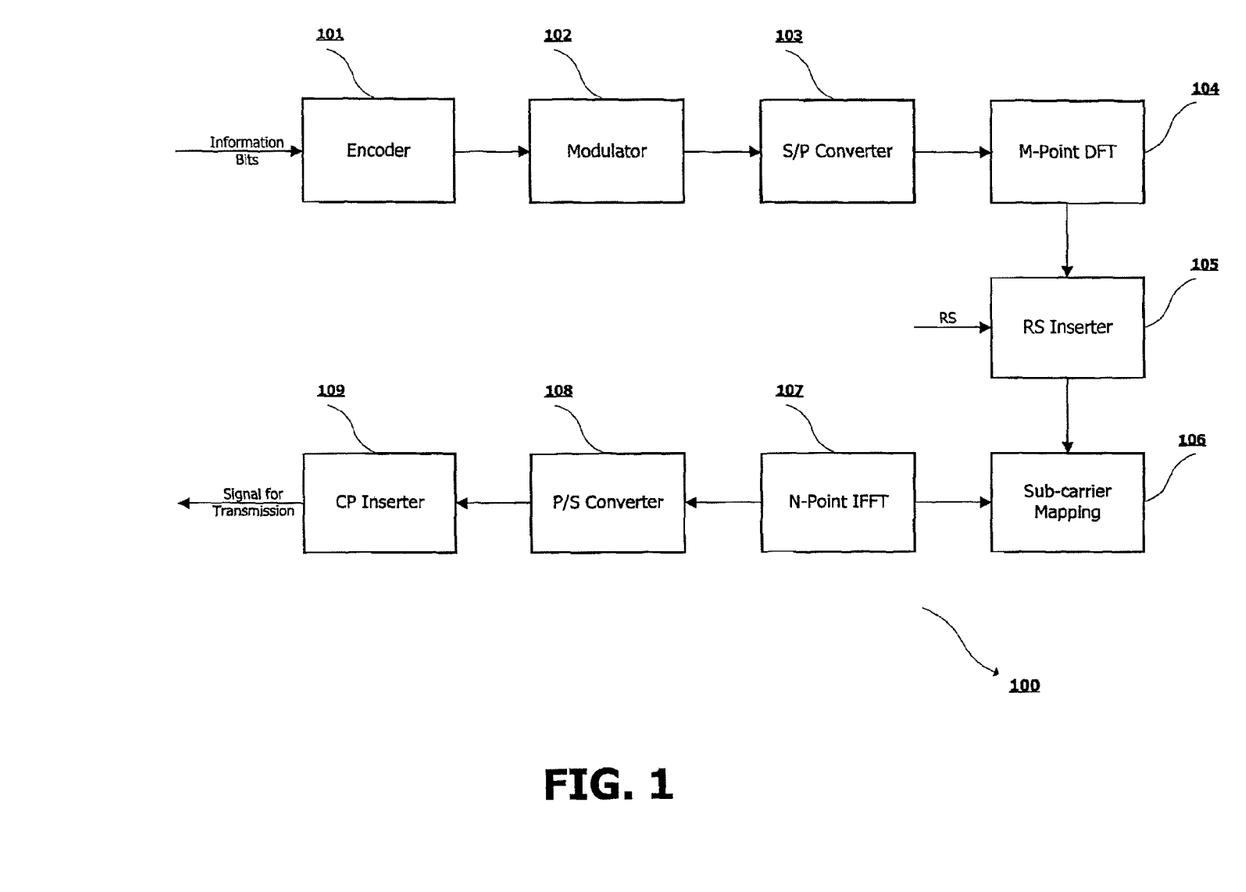
FIG. 1 shows a prior art apparatus for generating a signal for transmission in a transmitter of an SC-FDMA system.

A prior art apparatus 100 for generating a signal for transmission in a transmitter of an SC-FDMA system is illustrated in FIG. 1. As shown in FIG. 1, information bits to be communicated to the receiving side are first input to an encoder 101 and a modulator 102 to obtain a plurality of data symbol blocks. Each data symbol block, expressed as $d_n=[d_n^0, \ldots, d_n^{M-1}]^T$, includes M data symbols $d_n^i$, $0 \leq i \leq M-1$, where n represents the index of the symbol block in a sub-frame and T indicates transpose of a vector. Each data symbol block $d_n = [d_n^0, \ldots, d_n^{M-1}]^T$ is performed a serial-to-parallel (S/P) conversion in a S/P converter 103, and then is subject to an M-point discrete Fourier transformation (DFT) in a DFT unit 104, to produce a frequency-domain data sequence $c_n = [c_n^0, \ldots, c_n^{M-1}]^T$. Then, in a reference signal (RS) inserter 105, a number of predefined frequency-domain RS sequences, each of which also includes M elements and is also represented by $c_n=[c_n^0, \ldots, c_n^{M-1}]^T$, where n, however, indicates indices not used by data symbol blocks in a sub-frame, are multiplexed in time domain with the data sequences generated by the DFT unit 104. Then, elements of each $c_n$ (for all n) in a sub-frame are mapped to M sub-carriers scheduled by the base station in a sub-carrier mapping unit 106 to obtain a corresponding frequency-domain sequence, such as, for example, $C_n=[0, \ldots, 0, c_n^0, \ldots, c_n^{M-1}, 0, \ldots, 0]^T$. Subsequently, each $C_n$ is performed N-point inverse Fast Fourier transformation (IFFT) in an IFFT unit 107 to produce a time-domain symbol block $D_n$ including N elements, which is then performed a parallel-to-serial (P/S) conversion in a P/S converter 108. Finally, in a cyclic prefix (CP) inserter 109, a cyclic prefix is inserted before each of a plurality of time-domain symbol blocks outputted from the P/S converter 108. Thus, a digital discrete time signal for transmission is generated, which is then sent to a digital to analog (D/A) converter (not shown) for D/A conversion and a radio frequency (RF) section (not shown) of the transmitter to be subject to RF processing, and then is transmitted from an antenna (not shown) of the transmitter.

Figure 2:
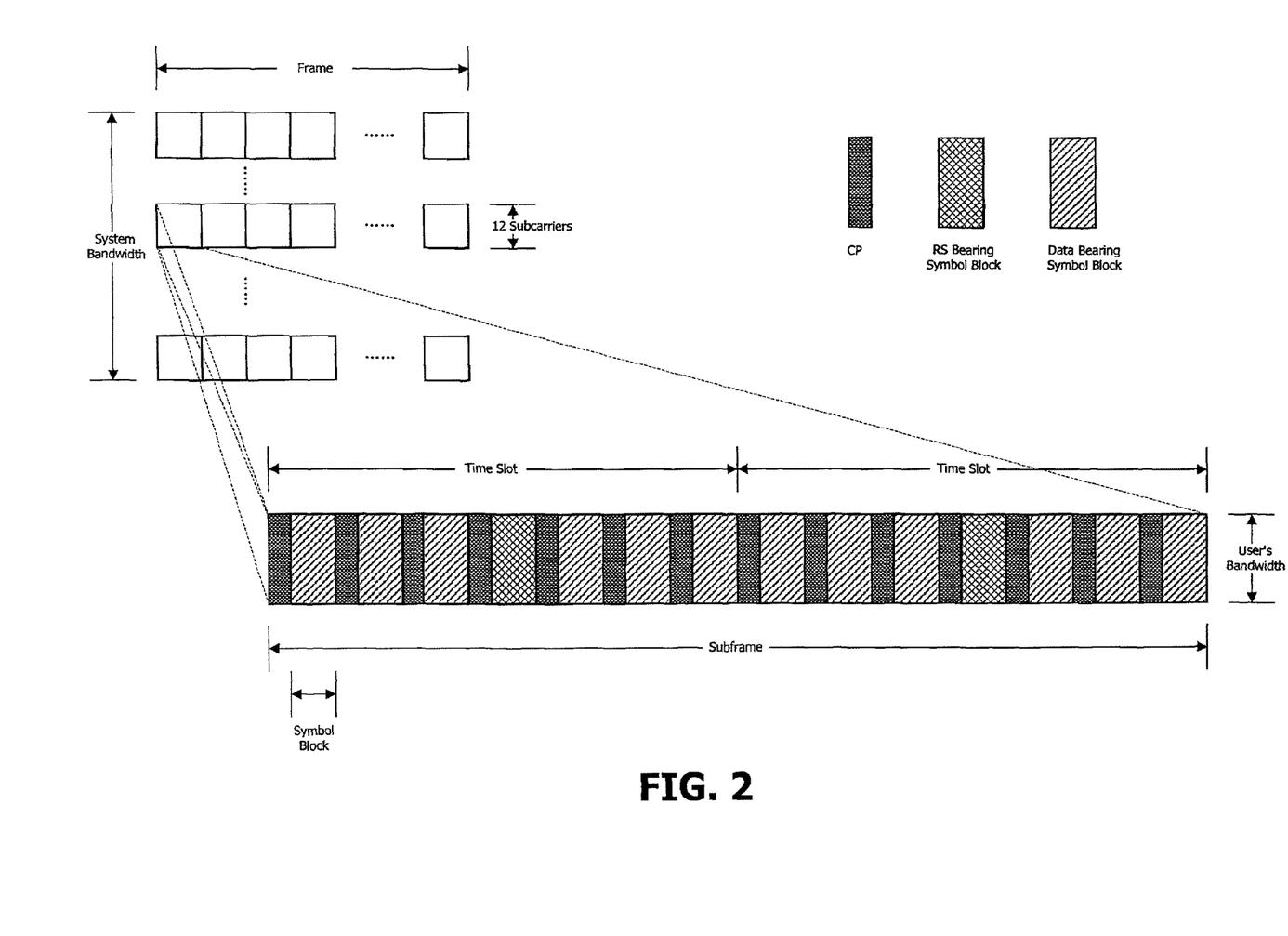
FIG. 2 is a schematic representation of the signal for transmission in a sub-frame generated by the apparatus shown in FIG. 1.
Figure 3:
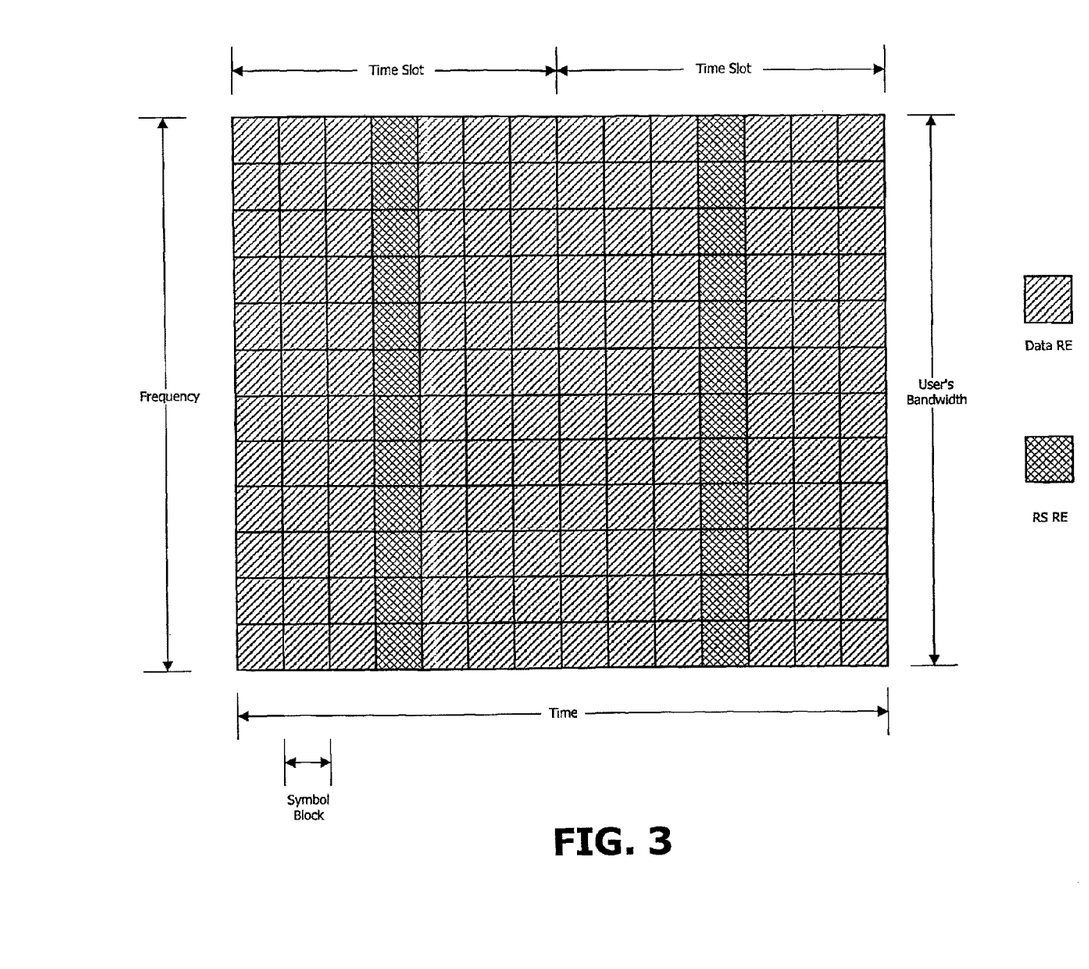
FIG. 3 is a more detailed representation of the generated signal for transmission.

FIG. 2 is a schematic representation of the signal for transmission in a sub-frame generated by the apparatus 100 shown in FIG. 1. FIG. 3 is a more detailed representation of the generated signal for transmission, with each square representing a resource element (RE). Note that the cyclic prefixes are omitted from FIG. 3.

As shown in FIGS. 2 and 3, in two continuous time slots (one sub-frame), each user has two symbol blocks (e.g., n=3, 10 in the figures) that only bear RS, and 12 symbol blocks (e.g., n=0, 1, 2, 4, 5, 6, 7, 8, 9, 11, 12, 13 in the figures) that only bear data. Each RS-bearing symbol block occupies the entire transmission bandwidth assigned to each user (for example, all the 12 sub-carriers assigned to the user as shown in the figures) in order to maintain the SC property of an SC-FDMA waveform.

However, in a case of high Doppler spread (e.g., up to 350 km/h and 2 GHz carrier frequency), a system with such an RS arrangement shown in FIGS. 2 and 3 can not provide sufficient ability for tracking channel variation. The tracking ability may be improved by simply increasing the density of RS-bearing symbol blocks in time. However, this will result in an unbearable overhead.

Therefore, a need exits for an apparatus and method for generating a signal for transmission in a single-carrier communication system, which can provide sufficient ability for tracking channel variation with reasonably low overhead in a case of high Doppler spread.

SUMMARY OF THE INVENTION

To address the above and other problems, an apparatus and method for generating a signal for transmission in a single-carrier communication system are provided.

According to an aspect of the invention, there is provided an apparatus for generating a signal for transmission in a single-carrier communication system, comprising a reference signal inserter, which multiplexes data symbols with reference signal symbols in time domain to form a plurality of symbol blocks as the signal for transmission, wherein the plurality of symbol blocks include symbol blocks of a first type and symbol blocks of a second type, wherein each of the symbol blocks of the first type includes only data symbols, and wherein each of the symbol blocks of the second type includes both data symbols and reference signal symbols.

According to another aspect of the invention, there is provided a method for generating a signal for transmission in a single-carrier communication system, comprising: multiplexing data symbols with reference signal symbols in time domain to form a plurality of symbol blocks as the signal for transmission, wherein the plurality of symbol blocks include symbol blocks of a first type and symbol blocks of a second type, wherein each of the symbol blocks of the first type includes only data symbols, and wherein each of the symbol blocks of the second type includes both data symbols and reference signal symbols.

Thus, an apparatus and method are provided for generating a signal for transmission in a single-carrier communication system that can provide sufficient ability for tracking channel variation with reasonably low overhead in a case of high Doppler spread.

DESCRIPTION OF THE DRAWINGS

The above and other features and advantages of the invention can be better understood by reading the detailed description below in connection with the drawings, in which same or similar reference signs are used to designate same or similar elements, in which.

DETAILED DESCRIPTION

The embodiments of the invention will be described in detail below with reference to the drawings.

Figure 4:
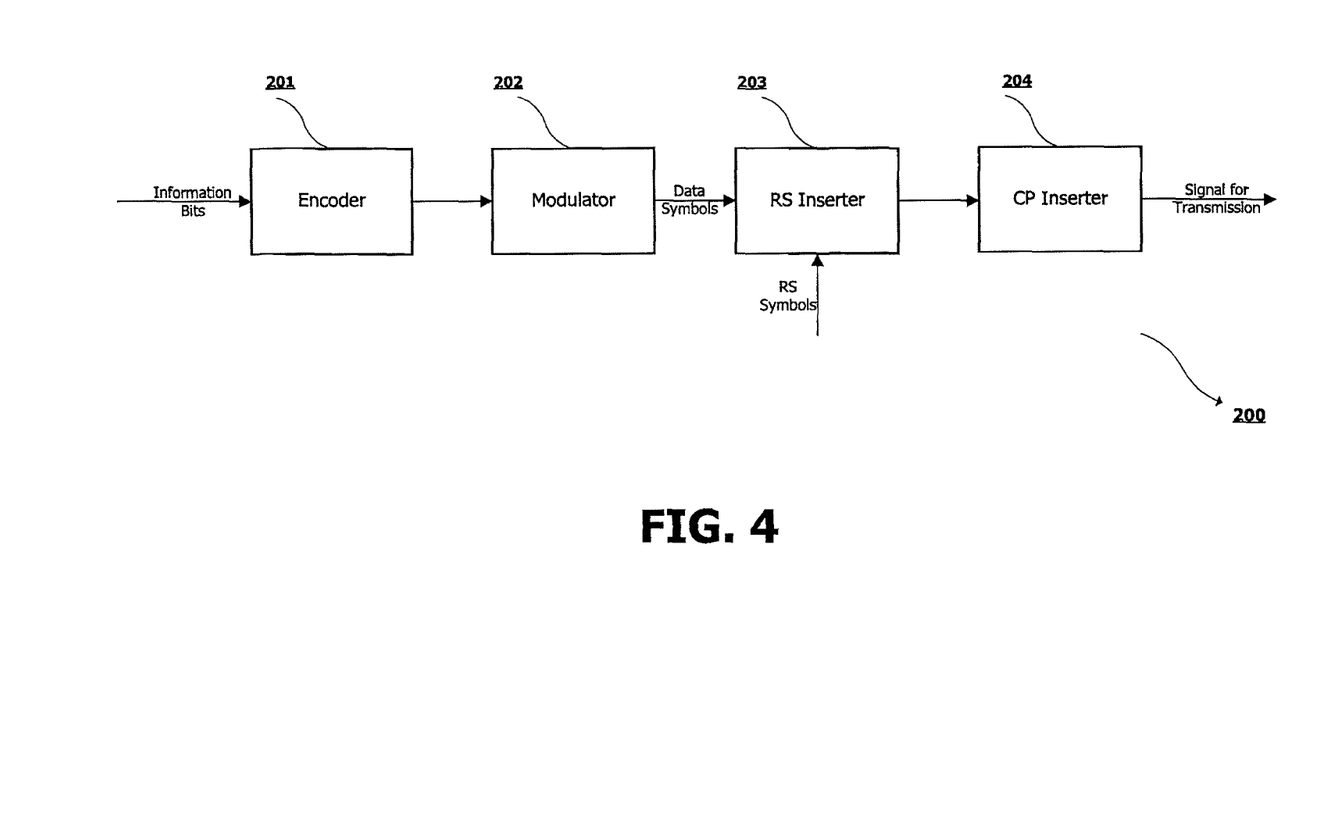
FIG. 4 is a block diagram showing an apparatus for generating a signal for transmission in a transmitter of a SC-FDE system according to a first embodiment of the invention.

FIG. 4 is a block diagram showing an apparatus 200 for generating a signal for transmission in a transmitter of a SC-FDE system according to a first embodiment of the invention. This embodiment is directed to a single-user SC-FDE system. When SC-FDE is used as the uplink scheme of a communication system, the transmitter and hence the apparatus 200 may be included in a mobile terminal (user equipment).

As shown in FIG. 4, information bits to be communicated to the receiving side are inputted to an encoder 201 and are performed channel coding therein. The channel coding performed by encoder 201 provides coding diversity against frequency selective fading channels and white noise. The encoded bits outputted by the encoder 201 are modulated by a modulator 202 onto baseband signals to map the bits into a plurality of data symbols. These data symbols are complex-value constellation symbols. Next, in a reference signal (RS) inserter 203, the data symbols outputted from the modulator 202 are multiplexed in time domain with pre-determined time-domain RS symbols, which may be complex-value symbols or binary symbols for example, to form a plurality of symbol blocks.

The term "symbol block" as used herein refers to a sequence of symbols, and can also be called "symbol sequence". In the context of SC-FDE or SC-FDMA systems, a "symbol block" may also be referred to as "SC-FDE symbol" or "SC-FDMA symbol" respectively, as can be understood by those skilled in the art.

The symbol blocks outputted from the RS inserter 203 include two types of symbol blocks. A symbol block of a first type, i.e., a data-only block, includes only data symbols. A symbol block of a second type, i.e., an RS-and-data-multiplexing block, includes both data symbols and reference signal symbols. In the present invention, multiplexing of RS and data for each symbol block of the second type is implemented in time domain to maintain the SC property of a SC-FDE waveform.

In an example, each of the symbol blocks of the first and second types is expressed as $d_n$ and includes M symbols, where n indicates the index of the symbol block in a frame, and $M>1$.

Each symbol block of the first type may be further expressed as $d_n=[d_n^0, \ldots, d_n^{M-1}]^T$, where each element $d_n^i$, $0 \le i \le M-1$, is a data symbol (a complex constellation symbol mapped from the encoded bits).

Figure 5A:
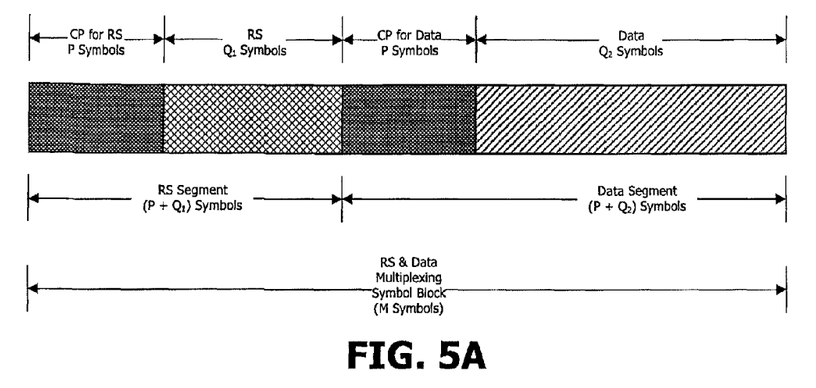
FIGS. 5A-5C illustrate the structure of each symbol block of the second type.
Figure 5B:
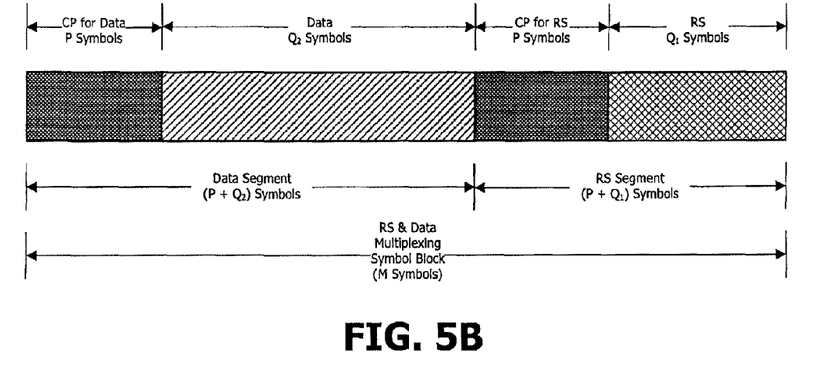
Figure 5C:
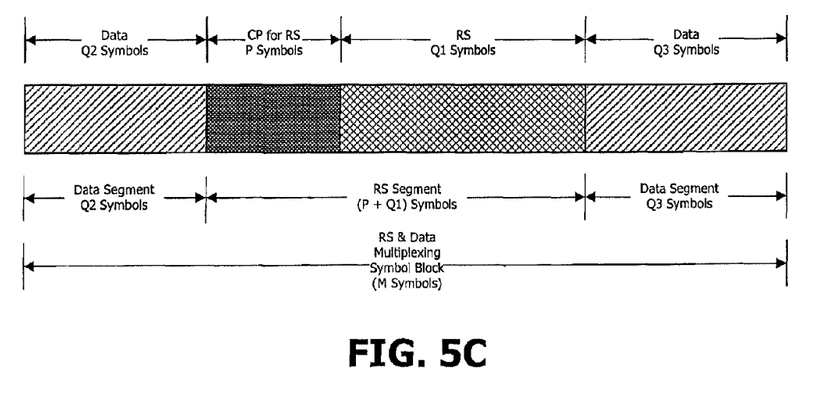

The structure of each symbol block of the second type is illustrated in more detail in FIGS. 5A-5C.

FIG. 5A shows a first example of the structure of a symbol block of the second type. As shown in FIG. 5A, each symbol block $d_n$ of the second type has two segments, namely, an RS segment and a data segment. The RS segment may include a cyclic prefix for RS, which has a length of P (i.e., includes P symbols), and an RS sequence $a_n$, which has a length of $Q_1$ (i.e., includes $Q_1$ symbols). The data segment may include a cyclic prefix for data, which has a length of P (i.e., includes P symbols), and a data sequence $b_n$, which has a length of $Q_2$ (i.e., includes $Q_2$ symbols). Note that the term "length" as used herein means the number of elements of a sequence or block. For example, the length of a symbol block means the number of symbols included in this symbol block. As another example, the length of a frequency-domain sequence may indicate the number of elements of this sequence. Also note that the RS sequence $a_n$ is determined in advance, and the choosing thereof is out of the scope of the invention.

Mathematically, each symbol block $d_n$ of the second type can be further expressed as:

$$d_n = \left[ \underbrace{a_n^{Q_1-P} \ldots a_n^{Q_1-1}}_{RS\ CP-P\ symbols}\ \underbrace{a_n^0 \ldots a_n^{Q_1-1}}_{a_n^T - Q_1\ symbols},\ \underbrace{b_n^{Q_2-P} \ldots b_n^{Q_2-1}}_{data\ CP-P\ symbols}\ \underbrace{b_n^0 \ldots b_n^{Q_2-1}}_{b_n^T - Q_2\ symbols} \right]^T,$$

where $2P+Q_1+Q_2=M$.

Inserting a CP for both the RS segment and the data segment in each symbol block $d_n$ of the second type eliminates inter-segment-interference (ISI) between RS and data segments and allows the RS and data segments to experience the circular channel impulse response (CIR) independently.

Although the CP for RS segment and the CP for data segment in the example shown in FIG. 5A and described above have the same length P, they may have different lengths, or the data segment may not have a cyclic prefix. To differentiate the CP's for RS and data segments within a symbol block and a cyclic prefix inserted before each symbol block by a cyclic prefix inserter 204 as described below, the CP's for RS and data segments within a symbol block may also be referred to as inner CP's. The lengths of inner CP's will be discussed in more detail below in connection with the length of the cyclic prefix inserted before each symbol block in a cyclic prefix inserter 204.

In addition, the number and positions of the symbol blocks of the second type relative to those of the symbol blocks of the first type in a frame may be determined by the mobile terminal and/or the base station depending on Doppler spread in the system. For example, the higher the Doppler spread is, the higher the ratio of the number of the symbol blocks of the second type to that of the symbol blocks of the first type in a frame will be. In other words, the higher the density in time of second type symbol blocks is, the better adaptation to fast time-varying fading channels can be provided.

Furthermore, the length of the RS sequence, $Q_1$, relative to the length of the data sequence, $Q_2$, in a symbol block of the second type can also be determined by the mobile terminal and/or the base station depending on Doppler spread in the system. For example, the higher the Doppler spread is, the higher the ratio $Q_1/Q_2$ will be.

FIG. 5B shows a second example of the structure of a symbol block of the second type. In the second example, the positions of the RS segment and the data segment in a block are inverted from those of the first example. Parameters may be the same as those of the first example.

FIG. 5C shows a third example of the structure of a symbol block of the second type. In the third example, a symbol block includes two data segments and one RS segment. The RS segment includes an RS CP of length P, and an RS sequence of length $Q_1$. The two data segments have no cyclic prefixes, and have a length of $Q_2$ ($Q_2 \geq 0$) and $Q_3$ ($Q_3 \geq 0$), respectively, where $P+Q_1+Q_2+Q_3=M$. It is possible that one of $Q_2$ and $Q_3$ equals to 0, in which case the symbol block will include an RS segment including an RS CP of length P and an RS sequence of length $Q_1$, and one data segment of length $Q_2$ or $Q_3$ without cyclic prefix. The values of $Q_2$ and $Q_3$ may be determined based on a predefined rule, which may depend on the positions of RS segments relative to the whole frame and may also be defined according to Doppler spread, and this may also affect the performance to some extent. Preferably, two data segments, if any, lie at the two ends of a symbol block, with the RS segment sandwiched therebetween. Other parameters may be the same as those of the first example.

The structures shown in FIGS. 5A-5C are only examples, and the invention is not limited thereto. Given the teachings of this specification, those skilled in the art can readily conceive various arrangements for the symbol blocks of the first and second types, which are within the scope of the present invention.

Turning back to FIG. 4, the plurality of symbol blocks outputted from the RS inserter 203 are inputted into a cyclic prefix (CP) inserter 204. In the CP inserter 204, a cyclic prefix is inserted before each of the symbol blocks, to eliminate the inter-block interference (the interference between symbol blocks) and make each symbol block experience the circular CIR independently.

Figure 6:
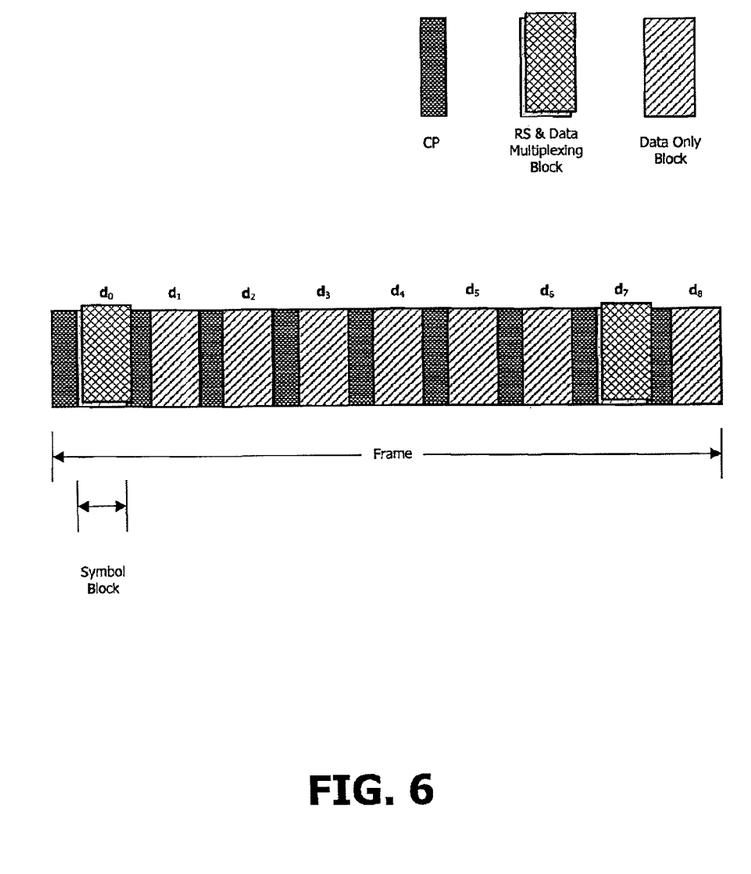
FIG. 6 is a schematic representation of a signal for transmission in a frame generated by the apparatus of the first embodiment.

FIG. 6 is a schematic representation of a signal for transmission in a frame generated by the apparatus 100 of the first embodiment. In the frame shown in FIG. 6, $d_1$-$d_6$ and $d_8$ are symbol blocks of the first type, $d_0$ and $d_7$ are symbol blocks of the second type, and a cyclic prefix is inserted before each of the symbol blocks.

The length $N_c$ of each cyclic prefix inserted by the CP inserter 204 may be determined based on channel order time L. For example, the length of each cyclic prefix inserted by the CP inserter 204, $N_c$, may satisfy the following expression:

$$N_c \geq \left\lceil \frac{L}{T_d} \right\rceil - 1, \quad (1)$$

where L is the channel order time (in units of nanoseconds, for example), $T_d$ is the time length of one symbol in a symbol block $d_n$ (in units of nanoseconds, for example), and $\lceil \ \rceil$ represents a ceiling function.

Further, assuming invariant CIR on each symbol block, the inner CP for RS segment and the inner CP for data segment within each symbol block of the second type may have the same length P, which may also be determined based on channel order time L, and may satisfy the following expression:

$$P \geq \left\lceil \frac{L}{T_d} \right\rceil - 1, \quad (2)$$

In an example, P can be equal to $N_c$. This handles the case in which channels have the highest degree of frequency selective fading allowed by the system and implies no need for explicit feedback of P as well.

In an example, $N_c$ and P are determined based on channel order time L in a statistical and empirical way. For example, the channel order time L may be statistically determined. In designing the system, channel order time L in various environments in which the transmitter may operate may be measured to obtain a plurality of values of the channel order time L. Then, the largest value among these values, which corresponds to the worst channel condition, may be used to derive $N_c$ and P using the expressions (1) and (2) above. Alternatively, a measured value of the channel order time L, which is larger than for example most (90% for example) of the measured values, may be used to derive $N_c$ and P using the expressions (1) and (2) above, thus taking most of the channel conditions into consideration.

Thus, a signal for transmission is generated, which is then sent to a D/A converter (not shown) for D/A conversion and a radio frequency (RF) section (not shown) of the transmitter to be subject to RF processing, and then is transmitted from an antenna (not shown) of the transmitter.

As described above, the number and positions of the symbol blocks of the second type relative to those of the symbol blocks of the first type in a frame may be adaptively set depending on Doppler spread. Also, the length of the RS sequence, relative to the length of the data sequence, $Q_2$, in a symbol block of the second type can also be adaptively set depending on Doppler spread. Thus, better adaptation to fast time-varying fading channels and improved ability for tracking channel variation in a high Doppler spread environment can be provided with a reasonably low overhead.

Figure 7:
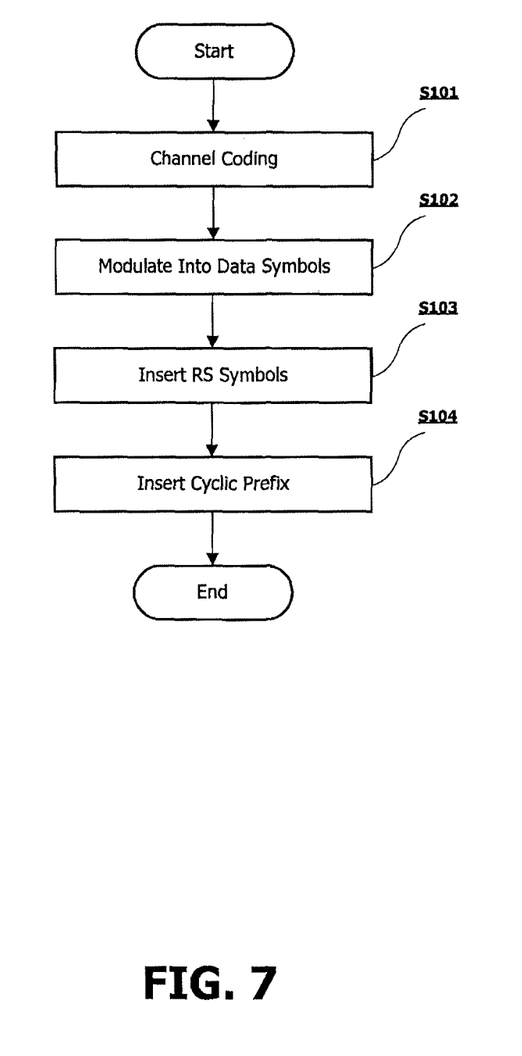
FIG. 7 is a flowchart showing a method for generating a signal for transmission performed by the apparatus according to the first embodiment of the invention.

FIG. 7 is a flowchart showing a method for generating a signal for transmission performed by the apparatus 200 according to the first embodiment of the invention. The method begins in step S101, where information bits are channel-coded by the encoder 201. In step S102, the encoded bits outputted by the encoder 201 are modulated by the modulator 202 to map the bits into a plurality of complex data symbols. Then, in step S103, the RS inserter 203 multiplexes predefined time-domain RS symbols and the data symbols outputted from the modulator 202 in time domain to form one or more symbol blocks of the first type and one or more symbol blocks of the second type. Next, in step S104, the CP inserter 204 inserts a cyclic prefix before each of the symbol blocks, and a signal for transmission is thus obtained.

Figure 8:
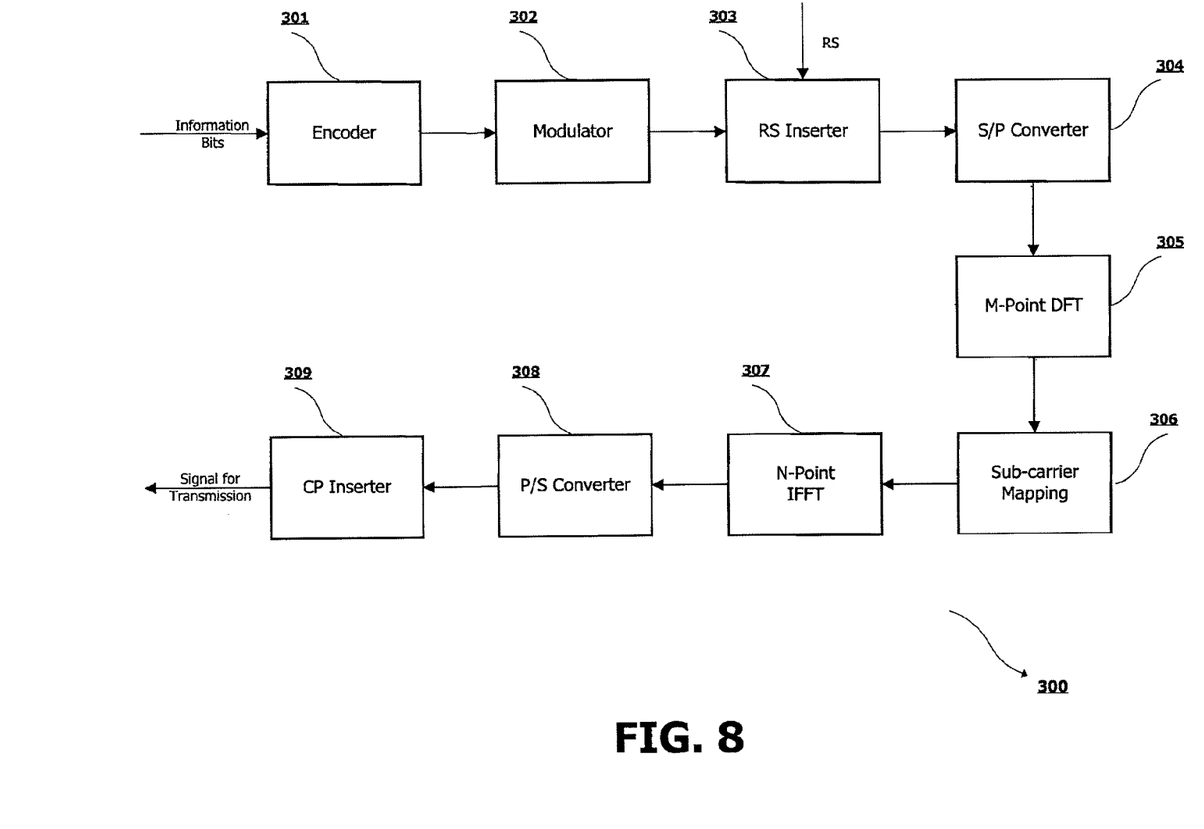
FIG. 8 is a block diagram showing an apparatus for generating a signal for transmission in a transmitter of an SC-FDMA system according to a second embodiment of the invention.

FIG. 8 is a block diagram showing an apparatus 300 for generating a signal for transmission in a transmitter of an SC-FDMA system according to a second embodiment of the invention. This embodiment is directed to a multi-user SC-FDMA system. When SC-FDMA is used as the uplink scheme of a communication system, the transmitter and hence the apparatus 300 may be included in a mobile terminal (user equipment).

As shown in FIG. 8, information bits to be communicated to the receiving side are inputted to an encoder 301 and are performed channel coding therein. The channel coding performed by encoder 301 provides coding diversity against frequency selective fading channels and white noise. The encoded bits outputted by the encoder 301 are modulated by a modulator 302 onto baseband signals to map the bits into a plurality of data symbols. These data symbols are complex-value constellation symbols. Next, in a reference signal (RS) inserter 303, the data symbols outputted from the modulator 302 are multiplexed in time domain with pre-determined time-domain RS symbols, which may be complex-value symbols or binary symbols for example, to form a plurality of symbol blocks.

Similarly as with the SC-FDE system of the first embodiment, the symbol blocks outputted from the RS inserter 303 also include two types of symbol blocks. Each of the first type of symbol blocks, i.e., data-only blocks, includes only data symbols. Each of the second type of symbol blocks, i.e., RS-and-data-multiplexing blocks, includes both data symbols and reference signal symbols. In this embodiment, multiplexing of RS and data for each symbol block of the second type is also implemented in time domain to maintain the SC property of a SC-FDMA waveform.

In an example, each of the symbol blocks of the first and second types is expressed as $d_n$ and includes M symbols, where n indicates the index of the symbol block in a sub-frame, and M>1.

Each symbol block of the first type may be further expressed as $d_n = [d_n^0, \ldots, d_n^{M-1}]^T$, where each element $d_n^i$, $0 \leq i \leq M-1$, is a data symbol (a complex constellation symbol mapped from the encoded bits).

The structure of each symbol block of the second type according to the second embodiment is similar as those of the first embodiment shown in FIGS. 5A-5C. The detailed descriptions thereof is therefore omitted when appropriate.

For example, similarly as with the example shown in FIG. 5A, each symbol block $d_n$ of the second type may include two segments, namely, an RS segment and a data segment. The RS segment may include a cyclic prefix for RS, which has a length of P (i.e., includes P symbols), and an RS sequence $a_n$, which has a length of $Q_1$ (i.e., includes $Q_1$ symbols). The data segment may include a cyclic prefix for data, which has a length of P (i.e., includes P symbols), and a data sequence $b_n$, which has a length of $Q_2$ (i.e., includes $Q_2$ symbols).

Thus, each symbol block $d_n$ of the second type can be further expressed as:

$$d_n = \left[ \underbrace{a_n^{Q_1-P} \ldots a_n^{Q_1-1}}_{RS\ CP-P\ symbols}\ \underbrace{a_n^0 \ldots a_n^{Q_1-1}}_{a_n^T-Q_1\ symbols},\ \underbrace{b_n^{Q_2-P} \ldots b_n^{Q_2-1}}_{data\ CP-P\ symbols}\ \underbrace{b_n^0 \ldots b_n^{Q_2-1}}_{b_n^T-Q_2\ symbols} \right]^T$$

where $2P+Q_1+Q_2=M$.

In the second embodiment, inserting a CP for both the RS segment and the data segment in each symbol block $d_n$ of the second type is also performed to eliminate inter-segment-interference (ISI) between RS and data segments and allow the RS and data segments to experience the circular channel impulse response (OR) independently.

The inner CP for RS segment and the inner CP for data segment may have the same length P as shown in FIG. 5A and described above, or may have different lengths. Alternatively, the data segment may not have a cyclic prefix, as shown in FIG. 5C, for example. The lengths of inner CP's for RS and data segments within a symbol block will be discussed in more detail below in connection with the length of the cyclic prefix inserted before each symbol block in a cyclic prefix inserter 309.

In addition, in the second embodiment, the number and positions of the symbol blocks of the second type relative to those of the symbol blocks of the first type in a sub-frame and the length of the RS sequence relative to the length of the data sequence in a symbol block of the second type may also be adaptively determined depending on Doppler spread in the system.

Turning back to FIG. 8, each symbol block $d_n$ (for all n) is performed a serial-to-parallel (S/P) conversion in a S/P converter 304, and then is subject to an M-point discrete Fourier transformation (DFT) in a DFT unit 305, to produce a frequency-domain sequence $c_n = [c_n^0, \ldots, c_n^{M-1}]^T$ (for all n), which includes M elements.

Then, the M elements of each $c_n$ are mapped by a sub-carrier mapping unit 305 to M sub-carriers in a continuous or discontinuous bandwidth scheduled by the base station, to obtain a corresponding frequency domain sequence $C_n$ including N elements, where N>1.

Those skilled in the art can conceive various methods for mapping a frequency-domain sequence of length M to a number of sub-carriers to obtain a corresponding sequence of length N. For example, if the sub-carriers are in a continuous bandwidth, $C_n$ may be obtained by padding zeros before and/or after the M elements of $c_n$ as follows:

$$C_n = [0, \ldots, 0, c_n^0, \ldots, c_n^{M-1}, 0, \ldots, 0]^T.$$

Then, each sequence $C_n$ is performed an N-point inverse Fast Fourier transformation (IFFT) in an IFFT unit 307 to generate a time-domain symbol block $D_n = [D_n^0, \ldots, D_n^{N-1}]^T$ including N elements, which is then performed a parallel-to-serial (P/S) conversion in a P/S converter 308.

Next, a cyclic prefix (CP) inserter 309 inserts a cyclic prefix before each symbol block $D_n$. Insertion of these cyclic prefixes may eliminate channel circular interference and inter-block interference.

Figure 9:
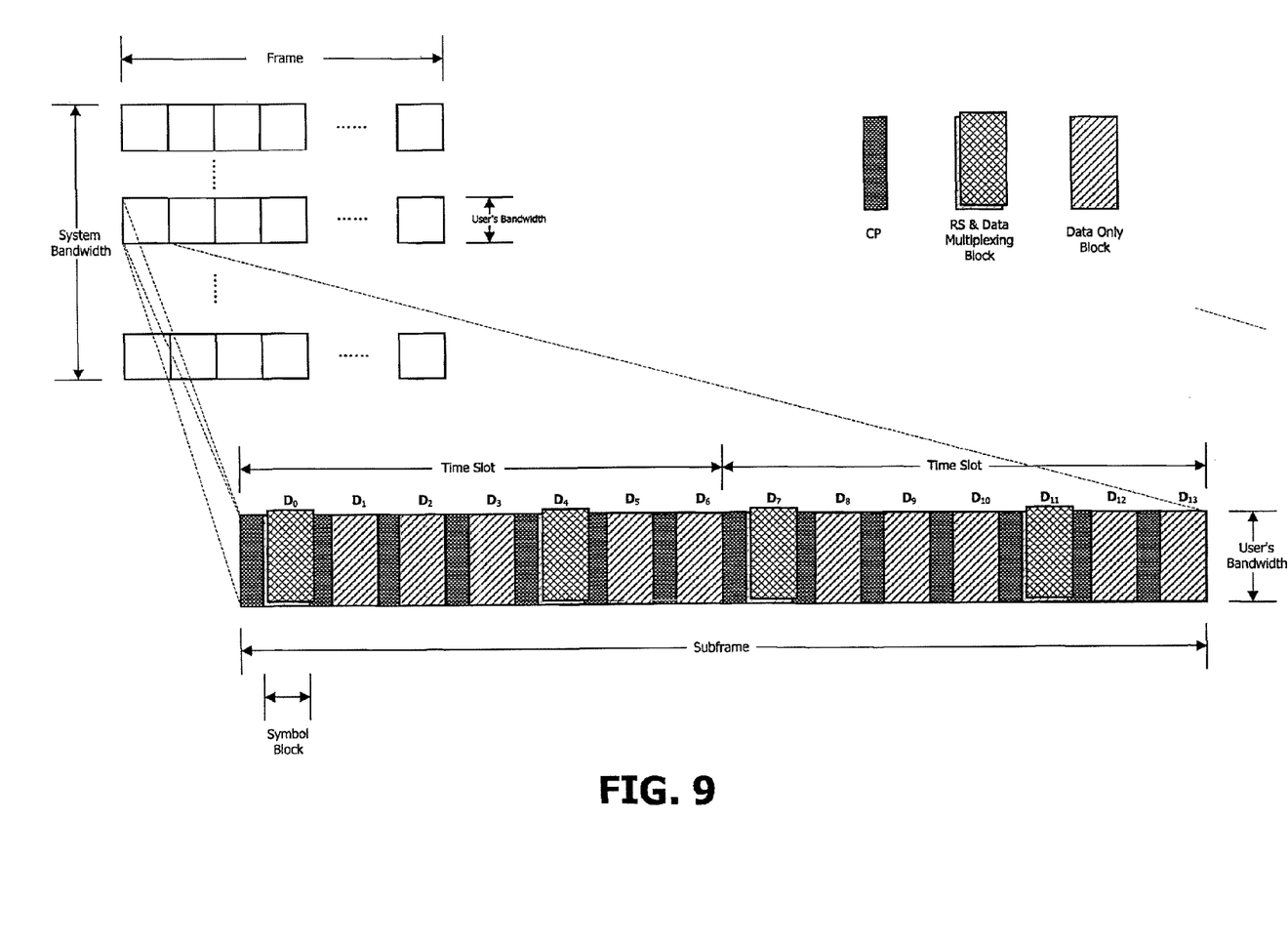
FIG. 9 is a schematic representation of the signal for transmission in a sub-frame generated by the apparatus shown in FIG. 8.
Figure 10:
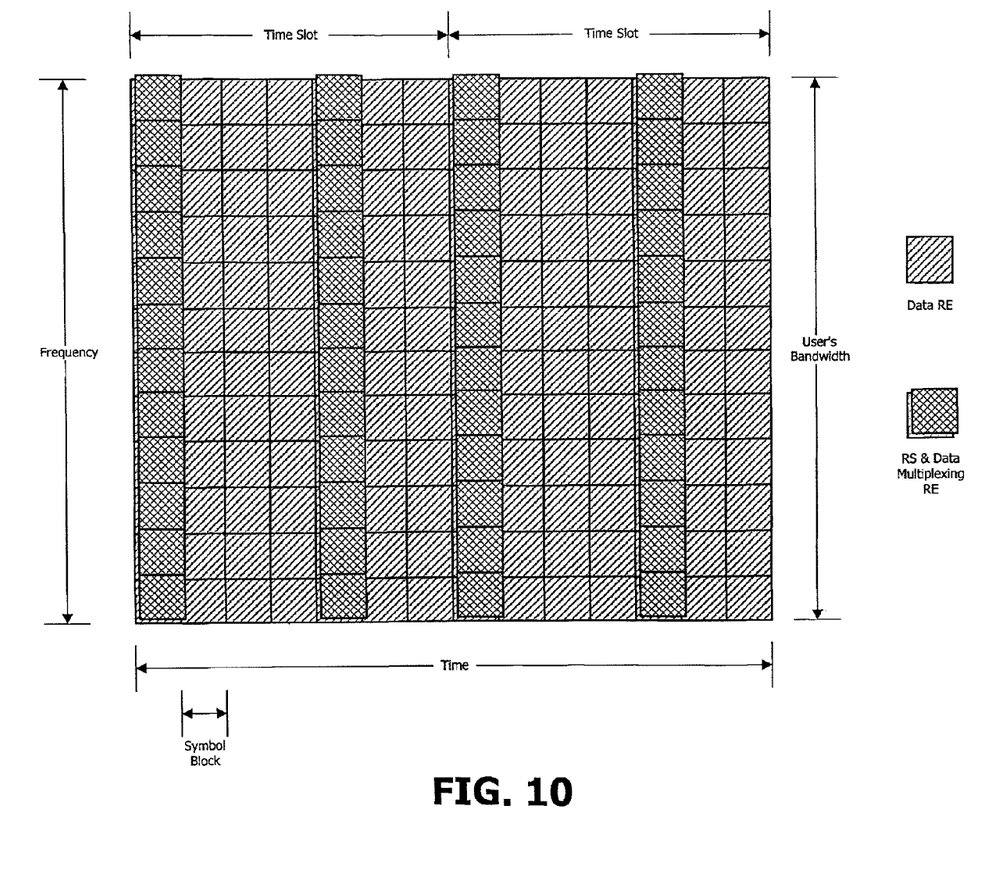
FIG. 10 is a more detailed representation of the generated signal for transmission.

FIG. 9 is a schematic representation of the signal for transmission in a sub-frame generated by the apparatus 300 shown in FIG. 8. FIG. 10 is a more detailed representation of the signal for transmission, with each square representing a resource element (RE). Note that the cyclic prefixes are omitted from FIG. 10. For example, in the sub-frame shown in FIG. 9, $D_1$-$D_3$, $D_5$, $D_6$, $D_8$-$D_{10}$, $D_{12}$ and $D_{13}$ correspond to symbol blocks of the first type, and $D_0$, $D_4$, $D_7$ and $D_{11}$ correspond to symbol blocks of the second type.

The length $N_c$ of each cyclic prefix inserted by the CP inserter 309 may be determined based on channel order time L. For example, the length of each cyclic prefix inserted in the CP inserter 309, $N_c$, may satisfy the following expression:

$$N_c \geq \left\lceil \frac{L}{T_D} \right\rceil - 1 \tag{3}$$

where L is the channel order time (in units of nanoseconds, for example), and $T_D$ is the time length of each of the N elements of a symbol block $D_n$ generated by the IFFT unit 307 (in units of nanoseconds, for example), and ⌈ ⌉ represents a ceiling function.

Further, assuming invariant CIR on each symbol block, the inner CP for RS segment and the inner CP for data segment within each symbol block $d_n$ of the second type outputted from the RS inserter 303 may have the same length P, which may be determined based on channel order time L, and may satisfy the following expression:

$$P \geq \left\lceil \frac{L}{T_d} \right\rceil - 1 = \left\lceil \frac{L}{T_D} \cdot \frac{M}{N} \right\rceil - 1, \quad (4)$$

where $T_d$ is the time length of one symbol in a symbol block $d_n$ (in units of nanoseconds, for example). For example, P can be chosen to be equal to ⌈$N_cM/N$⌉, which handles the case in which channels have the highest degree of frequency selective fading allowed by the system and implies no need for explicit feedback of P as well.

Similarly as with the first embodiment, $N_c$ and P can be determined based on channel order time L in a statistical and empirical way. Further, the channel order time L may be statistically determined in a similar way as in the first embodiment.

Thus, a signal for transmission is generated, which is then sent to a D/A converter (not shown) for D/A conversion and a radio frequency (RF) section (not shown) of the transmitter to be subject to RF processing, and is transmitted from an antenna (not shown) of the transmitter.

As described above, in the second embodiment, similarly as in the first embodiment, better adaptation to fast time-varying fading channels and improved ability for tracking channel variation in a high Doppler spread environment can be provided with a reasonably low overhead.

Figure 11:
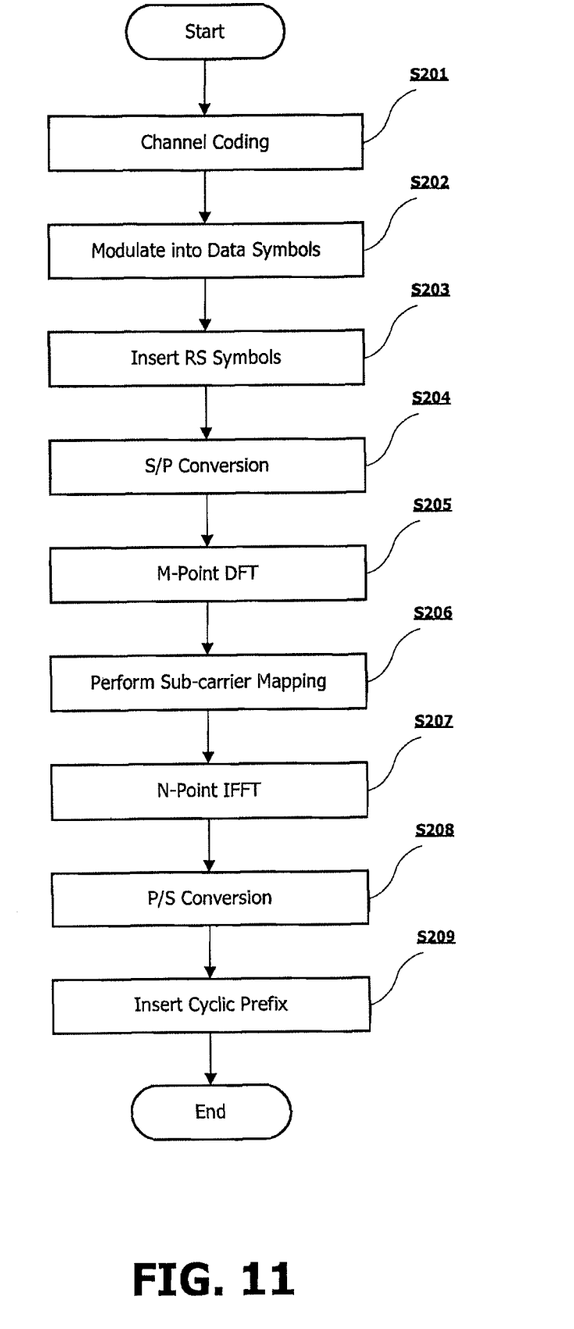
FIG. 11 is a flowchart showing a method for generating a signal for transmission performed by the apparatus according to the second embodiment of the invention.

FIG. 11 is a flowchart showing a method for generating a signal for transmission performed by the apparatus 300 according to the second embodiment of the invention. The method begins in step S201, where information bits are channel-coded by the encoder 301. In step S202, the encoded bits outputted by the encoder 301 are modulated by the modulator 302 to map the bits into a plurality of data symbols. Then, in step S203, the RS inserter 303 multiplexes predefined time-domain RS symbols and the data symbols outputted from the modulator 302 in time domain to form one or more symbol blocks of the first type and one or more symbol blocks of the second type, each block having a length of M. Each symbol block is then performed S/P conversion in step S204, and is performed an M-point DFT in step S205 to produce a corresponding frequency-domain sequence $c_n$. Then, in step S206, elements of each frequency-domain sequence produced in step S205 are mapped to M sub-carriers by the sub-carrier mapping unit 306, to produce a corresponding frequency-domain sequence $C_n$ of length N. Then, in step S207, each sequence $C_n$ is performed an N-point IFFT in the IFFT unit 307 to produce a corresponding time-domain symbol block $D_n$ of length N. Next, in step S208, each symbol block $D_n$ is performed P/S conversion. Then, in step S209, the CP inserter 309 inserts a cyclic prefix before each symbol block $D_n$. Thus, a signal for transmission is obtained.

Although some specific embodiments of the invention have been described, those skilled in the art can appreciate that various modifications, combinations and alterations may be made to the invention, and the invention covers such modifications, combinations and alterations as fall within the scope of the appended claims.

What is claimed is:

1. An apparatus for generating a signal for transmission in a single-carrier communication system, comprising:
   a reference signal inserter, which multiplexes data symbols with reference signal symbols in time domain to form a plurality of symbol blocks as the signal for transmission, wherein the plurality of symbol blocks include symbol blocks of a first type and symbol blocks of a second type, wherein each of the symbol blocks of the first type includes only data symbols, and wherein each of the symbol blocks of the second type includes both data symbols and reference signal symbols;
   a Discrete Fourier Transform unit which performs Discrete Fourier Transform on each of the plurality of symbol blocks to produce a respective one of a plurality of first frequency-domain sequences;
   a sub-carrier mapping unit which maps elements of each of the first frequency-domain sequences onto a set of sub-carriers to produce a respective one of a plurality of second frequency-domain sequences;
   an Inverse Fast Fourier Transform unit which performs Inverse Fast Fourier Transform on each of the second frequency-domain sequences to produce a respective one of a plurality of second symbol blocks; and,
   a cyclic prefix inserter which inserts a cyclic prefix for each of the plurality of second symbol blocks.

2. The apparatus of claim 1, further comprising:
   a cyclic prefix inserter which inserts a cyclic prefix for each of the plurality of symbol blocks.

3. The apparatus of claim 1, wherein the number of the symbol blocks of the second type relative to the number of the symbol blocks of the first type is determined based on Doppler spread.

4. The apparatus of claim 1, wherein the number of reference signal symbols relative to the number of data symbols in each of the symbol blocks of the second type is determined based on Doppler spread.

5. The apparatus of claim 1, wherein each of the symbol blocks of the second type includes an inner cyclic prefix for reference signal symbols therein.

6. The apparatus of claim 5, wherein the length of the inner cyclic prefix is determined based on channel order time.

7. The apparatus of claim 6, wherein the length of the inner cyclic prefix satisfies the following expression:

$$P \geq \left\lceil \frac{L}{T_d} \right\rceil - 1$$

where P is the length of the inner cyclic prefix, L is channel order time, $T_d$ is the time length of one symbol in each of the symbol blocks of the second type, and ⌈ ⌉ represents a ceiling function.

8. The apparatus of claim 6, wherein the channel order time is statistically determined.

9. A method for generating a signal for transmission in a single-carrier communication system, comprising:
   multiplexing data symbols with reference signal symbols in time domain to form a plurality of symbol blocks as the signal for transmission, wherein the plurality of symbol blocks include symbol blocks of a first type and symbol blocks of a second type, wherein each of the symbol blocks of the first type includes only data symbols, and wherein each of the symbol blocks of the second type includes both data symbols and reference signal symbols;

performing Discrete Fourier Transform on each of the plurality of symbol blocks to produce a respective one of a plurality of first frequency-domain sequences;

mapping elements of each of the first frequency-domain sequences onto a set of sub-carriers to produce a respective one of a plurality of second frequency-domain sequences;

performing Inverse Fast Fourier Transform on each of the second frequency-domain sequences to produce a respective one of a plurality of second symbol blocks; and inserting a cyclic prefix for each of the plurality of second symbol blocks.

10. The method of claim 9, further comprising:

inserting a cyclic prefix for each of the plurality of symbol blocks.

11. The method of claim 9, wherein the number of the symbol blocks of the second type relative to the number of the symbol blocks of the first type is determined based on Doppler spread.

12. The method of claim 9, wherein the number of reference signal symbols relative to the number of data symbols in each of the symbol blocks of the second type is determined based on Doppler spread.

13. The method of claim 9, wherein each of the symbol blocks of the second type includes an inner cyclic prefix for reference signal symbols therein.

14. The method of claim 13, wherein the length of the inner cyclic prefix is determined based on channel order time.

15. The method of claim 14, wherein the length of the inner cyclic prefix satisfies the following expression:

$$P \geq \left\lceil \frac{L}{T_d} \right\rceil - 1$$

where P is the length of the inner cyclic prefix, L is channel order time, $T_d$ is the time length of one symbol in each of the symbol blocks of the second type, and $\lceil \ \rceil$ represents a ceiling function.

16. The method of claim 14, wherein the channel order time is statistically determined.

* * * * *

UNITED STATES PATENT AND TRADEMARK OFFICE
CERTIFICATE OF CORRECTION

| | | |
|---|---|---|
| PATENT NO. | : 8,891,556 B2 | Page 1 of 1 |
| APPLICATION NO. | : 13/697147 | |
| DATED | : November 18, 2014 | |
| INVENTOR(S) | : Wu et al. | |

It is certified that error appears in the above-identified patent and that said Letters Patent is hereby corrected as shown below:

In the Drawings

Drawing Sheet 1 of 11: Below "FIG. 1" insert -- PRIOR ART --

Drawing Sheet 2 of 11: Below "FIG. 2" insert -- PRIOR ART --

Drawing Sheet 3 of 11: Below "FIG. 3" insert -- PRIOR ART --

In the Specification

Column 6, Line 48: Delete "sequence," and insert -- sequence, $Q_1$, --

Column 8, Line 2: Delete "(OR)" and insert -- (CIR) --

Signed and Sealed this
Seventeenth Day of May, 2016

Michelle K. Lee
*Director of the United States Patent and Trademark Office*